A. E. CUMMINS.
PRESS FOR COMPRESSING AND BALING COTTON AND OTHER MATERIALS.
APPLICATION FILED OCT. 26, 1914.
1,147,215. Patented July 20, 1915.
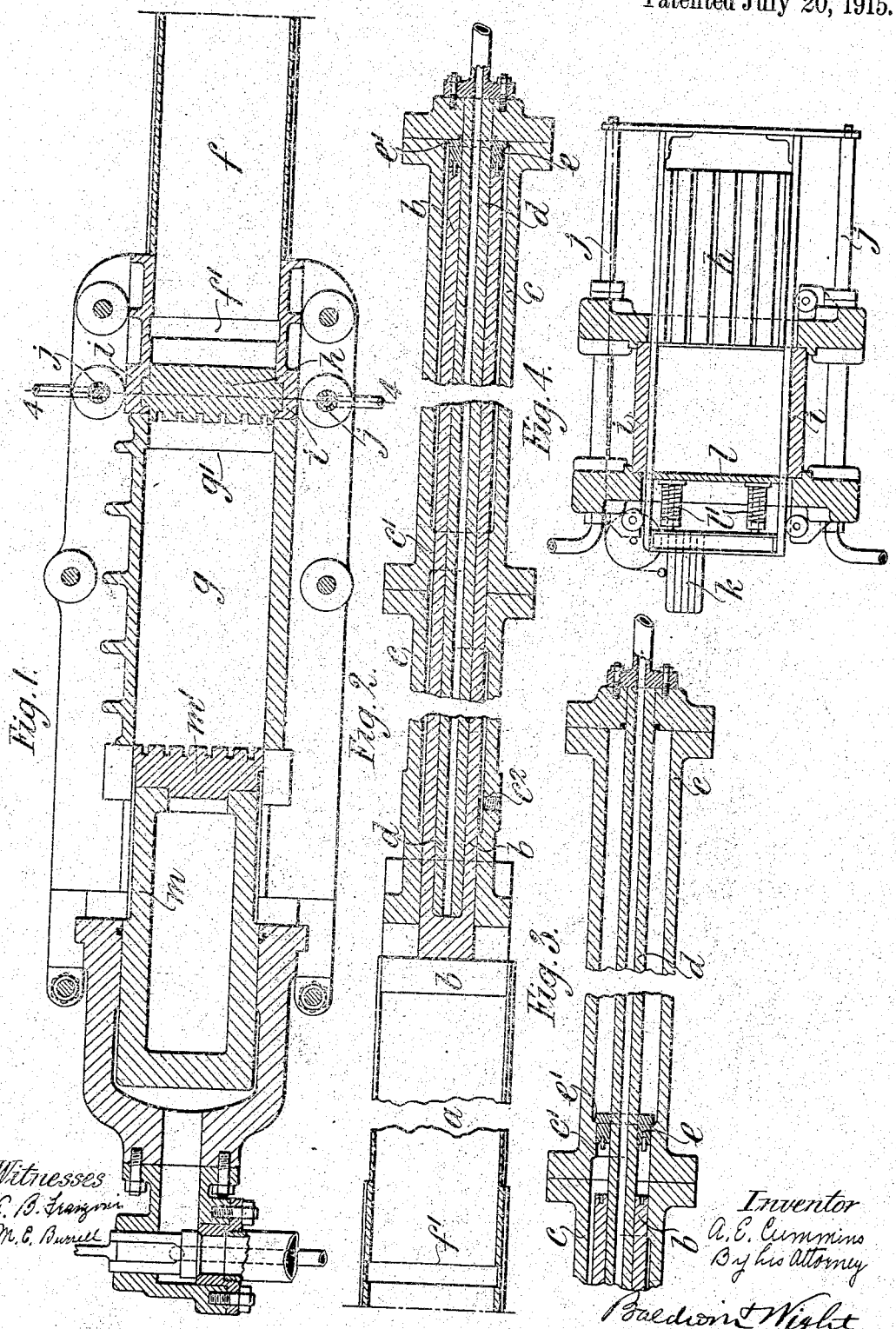

UNITED STATES PATENT OFFICE.

ARTHUR ELPHINSTONE CUMMINS, OF HAMPSTEAD, ENGLAND, ASSIGNOR OF ONE-HALF TO ROBERT BRIDGE, OF MANCHESTER, ENGLAND.

PRESS FOR COMPRESSING AND BALING COTTON AND OTHER MATERIALS.

1,147,215.　Specification of Letters Patent.　Patented July 20, 1915.

Application filed October 26, 1914. Serial No. 868,701.

*To all whom it may concern:*

Be it known that I, ARTHUR ELPHINSTONE CUMMINS, a subject of the King of Great Britain, residing at 12 Belsize avenue, Hampstead, in the county of Middlesex, England, have invented new and useful Improvements in Presses for Compressing and Baling Cotton and other Materials, of which the following is a specification.

This invention has reference to horizontal presses for baling cotton, jute or other fibrous materials into bales, and especially to presses in which the bales are formed by pressure in the direction of their length for which a British patent was granted to Claudius James Ash, (a communication from Arthur Elphinstone Cummins) No. 4262 of 1883, in which was described a vertical press having a single fixed baling chamber and a plurality of revolving filling boxes rotating on upright columns, the charges from each box being pushed, one by one, into the baling chamber by the action of the small ram of a telescopic system, the charges being retained in the baling chamber by revolving fingers previous to the final compression by the large ram of the telescopic system.

In the specifications of the British Patent No. 4367 of 1904 and the United States Patent No. 590681 granted to Arthur Elphinstone Cummins are described baling presses, now in common use, having a single baling chamber in which the bales are finished, combined with one long loose cotton filling box, all in one line. Such presses are only suitable for a very large outturn in bales.

The object of the present invention is to provide a perfect machine at a moderate cost for making bales of any required density pressed in the direction of their length and having a moderate outturn of bales more in accord with the wants of many pressing establishments, and to construct a press of the smallest weight consistent with the duty to be performed, and capable of being easily moved from place to place and of being erected at little expense.

According to this invention the press consists of a horizontal loose cotton filling box of a capacity insufficient to hold the material required to form a bale, and having at one end a ram, and at the other end two baling chambers, all in one line with the filling box. The required number of charges, say three, are first compressed in the baling chamber nearest the filling box, after which the bale is pushed into the finishing chamber for its final compression. At the end of the finishing chamber remote from the loose filling box is a ram and cylinder by which the bale is finally compressed, while the preliminary compression of the material is taking place in the preliminary baling chamber.

Between the preliminary and finishing baling chambers is a movable lashing plate extending across the press between the baling chambers. When it is desired to push the partly condensed material from the preliminary chamber to the finishing chamber the lashing plate is moved away transversely to the press. When inside the press the lashing plate takes the entire strain from the finishing ram on one side, and receives a balancing strain on the other side from the other ram. In order to retain a charge in a baling chamber when the ram is withdrawn the sectional area of the end of the chamber is made slightly larger than the sectional area of the chamber.

Figure 1 is a longitudinal section of the lefthand end of a press constructed according to this invention, and Fig. 2 is a like view of the righthand end. Fig. 3 is a view similar to a portion of Fig. 2 but showing the parts in a different position. Fig. 4 is a transverse section on the line 4—4 Fig. 1.

$a$ is the long loose cotton filling box. It is provided with doors (not shown) in the ordinary way.

$b$ is a hollow ram in the cylinder $c$. This ram is guided and supported by a pipe $d$ fixed in the cylinder and which, during the second half of the outward stroke of the ram, is in its turn supported by the guide $e$, which is detachably fixed to and moves with the inner end of the ram during the first part of the stroke. The guide $e$ fits a portion $c^1$ (of reduced diameter) of the cylinder $c$ and is prevented from passing this by reason of the collar $e^1$ on its rear end. The ram $b$ at this point therefore separates from the guide leaving it behind as shown at Fig. 3. Water is admitted through the pipe $d$, only the internal diameter of the ram being exposed to pressure, but if and when additional power is required water is also admitted into the cylinder $c$ at $c^2$ the whole area of the ram being then exposed to pressure.

$f$ is the preliminary baling chamber and $f^1 f^1$ are portions of enlarged diameter near its two ends into which the material expands and thus retains the compressed charge in the chamber when the ram $b$ is withdrawn.

$g$ is the finishing baling chamber provided with a shoulder $g^1$ which serves the same purpose as the grooves $f^1$. The chamber $g$ is provided with the usual lashing and releasing doors which are not shown.

$h$ is a lashing plate between the chambers $f$ and $g$. The plate $h$ is free to move in transverse guides $i$ and is moved in one direction by the hydraulic rams $j$ and in the other direction by the weight $k$.

$l$ is a door acted on by springs $l^1 l^1$, which, when the lashing plate $h$ is withdrawn, closes the opening through which it passed, this door acting as a buffer when the plate returns.

$m$ is the finishing ram and $m^1$ is a lashing plate fixed to it.

The means for returning the rams may be of any ordinary type and are not shown.

The operation is as follows:—The box $a$ is filled with loose cotton which is then compressed by the ram $b$ into the chamber $f$, the end of which is closed by the plate $h$. The ram $b$ is then withdrawn and the box $a$ is again filled and its contents compressed into the chamber $f$. If three charges of the box $a$ are sufficient to form a bale the plate $h$ is now withdrawn and the third stroke of the ram $b$ is made longer than the preceding ones so that the three charges are forced together into the finishing chamber $g$, the end of which is then again closed by the plate $h$. The three charges are then compressed together into a bale by the ram $m$ and the bale is lashed in the ordinary way and removed from the chamber $g$. During these operations charges for forming a second bale are being compressed in the chamber $f$; these charges are forced into the chamber $g$ as soon as it is empty and so on.

What I claim is:—

1. The combination of a filling box, a preliminary baling chamber and a finishing baling chamber all in the same horizontal straight line, a removable plate interposed between the two baling chambers, a ram in the filling box for compressing successive charges of material in the preliminary baling chamber against the said plate and for moving the compressed material into the finishing chamber, and a ram in the finishing chamber for compressing the material against said plate.

2. The combination of a filling box, a preliminary baling chamber and a finishing baling chamber all in the same horizontal straight line, and which preliminary chamber is provided with means for holding the compressed material against endwise movement after preliminary compression, a removable plate interposed between the two baling chambers, a ram in the filling box for compressing successive charges of material in the preliminary baling chamber against said plate and for moving the compressed material from the preliminary chamber into the finishing chamber, and a ram in the finishing chamber for compressing the material against said plate.

3. The combination of a filling box, a preliminary baling chamber and a finishing baling chamber all in the same horizontal straight line, a removable plate interposed between the two baling chambers, a ram in the filling box for compressing successive charges of material in the preliminary baling chamber against said plate and for moving the compressed material from the preliminary chamber into the finishing chamber, and a ram in the finishing chamber for compressing the material against said plate, said preliminary and finishing baling chambers being provided with means for holding against endwise movement the compressed material on the retreat of the ram which operates in the filling box and preliminary chamber.

4. The combination of a preliminary baling chamber, a finishing baling chamber, and a plate between the two chambers and movable transversely to them, a portion of the preliminary chamber adjacent to the plate being of a different diameter to the remainder and adapted to limit the expansion of material against the plate.

5. The combination of a preliminary baling chamber, a finishing baling chamber, rams operating in the two chambers, and a plate between the two chambers movable transversely to them, a portion of the preliminary chamber adjacent to the plate being of a different diameter to the remainder of said chamber and a portion of the finishing chamber adjacent to the plate being of a different diameter to the remainder of the chamber, and rams operating in the chambers adapted to move simultaneously toward said plate.

ARTHUR ELPHINSTONE CUMMINS.

Witnesses:
H. D. JAMESON,
O. J. WORTH.